(12) United States Patent
Webb et al.

(10) Patent No.: US 10,187,264 B1
(45) Date of Patent: Jan. 22, 2019

(54) GATEWAY PATH VARIABLE DETECTION FOR METRIC COLLECTION

(71) Applicant: INTUIT INC., Mountain View, CA (US)

(72) Inventors: Jason Webb, San Diego, CA (US); Shashi Shilarnav, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 132 days.

(21) Appl. No.: 15/432,507

(22) Filed: Feb. 14, 2017

(51) Int. Cl.
  *H04L 12/24* (2006.01)
  *H04L 12/26* (2006.01)
  *H04L 12/753* (2013.01)
  *H04L 29/06* (2006.01)

(52) U.S. Cl.
  CPC ............ *H04L 41/12* (2013.01); *H04L 43/045* (2013.01); *H04L 43/08* (2013.01); *H04L 43/16* (2013.01); *H04L 45/48* (2013.01); *H04L 67/42* (2013.01)

(58) Field of Classification Search
  CPC ......................................... H04L 41/12
  USPC ........................................... 709/224
  See application file for complete search history.

(56) References Cited

U.S. PATENT DOCUMENTS

| 6,571,230 | B1 * | 5/2003 | Parida ............... G06F 17/30985 341/55 |
| 7,162,485 | B2 * | 1/2007 | Gottlob ............. G06F 17/30932 707/769 |
| 7,826,365 | B2 * | 11/2010 | Tang ....................... H04L 47/70 370/235 |
| 9,135,367 | B2 * | 9/2015 | Li ..................... G06F 17/30932 |
| 9,165,086 | B2 * | 10/2015 | Idicula ................ G06F 17/2247 |
| 9,195,939 | B1 * | 11/2015 | Goyal ...................... G06N 5/02 |
| 2002/0143587 | A1 * | 10/2002 | Champernowne ..... G06Q 10/02 705/5 |
| 2004/0255246 | A1 * | 12/2004 | Douglis .............. G06F 17/2205 715/234 |
| 2004/0260676 | A1 * | 12/2004 | Douglis .............. G06F 17/3089 |
| 2007/0206221 | A1 * | 9/2007 | Wyler ............... G06F 17/30905 358/1.15 |
| 2008/0301316 | A1 * | 12/2008 | Alpern .................. G06F 9/4843 709/231 |

(Continued)

OTHER PUBLICATIONS

Chinnici et al. "Web Services Description Language (WSDL) Version 2.0 Part 2: Adjuncts", 2007 (Year: 2007).*

(Continued)

*Primary Examiner* — Ondrej C Vostal
(74) *Attorney, Agent, or Firm* — Patterson & Sheridan LLP

(57) ABSTRACT

The present disclosure relates to gateway path variable detection for metric collection. In some embodiments, a gateway receives a plurality of requests from one or more clients, wherein each request of the plurality of requests is directed to a service and comprises a path. In some embodiments, the gateway separates the path of each request into one or more sub-paths and inserts nodes representing each sub-path into a tree hierarchically based on the path, excluding redundant nodes. If a node has a parent node in the tree, in some embodiments, the gateway determines whether a number of child nodes of the parent node exceeds a variance threshold and, if so, identifies the sub-path as a variable and collapses all nodes at the same level into one node representing the variable, inserting child nodes of collapsed nodes as child nodes of the one node, and removing redundant child nodes.

21 Claims, 10 Drawing Sheets

(56) References Cited

U.S. PATENT DOCUMENTS

| | | | | |
|---|---|---|---|---|
| 2008/0313196 A1* | 12/2008 | Furusho | ............ | G06F 17/30336 |
| 2010/0076940 A1* | 3/2010 | Bordawekar | ..... | G06F 17/30961 |
| | | | | 707/704 |
| 2010/0332444 A1* | 12/2010 | Akatsu | ................ | G06F 17/5095 |
| | | | | 706/54 |
| 2011/0066662 A1* | 3/2011 | Davis | .................. | G06F 17/2745 |
| | | | | 707/811 |
| 2012/0072825 A1* | 3/2012 | Sherkin | ............ | G06F 17/30719 |
| | | | | 715/234 |
| 2012/0323824 A1* | 12/2012 | Gansner | ................ | G06Q 10/10 |
| | | | | 706/11 |
| 2018/0225315 A1* | 8/2018 | Boles | ................ | G06F 17/30477 |

OTHER PUBLICATIONS

Christensen et al., "Web Services Description Language (WSDL) 1.1", 2001 (Year: 2001).*
Ten Cate, "The Expressivity of XPath with Transitive Closure", 2006 (Year: 2006).*
Vion-Dury, "XPath on Left and Right Sides of Rules: Toward Compact XML Tree Rewriting through Node Patterns", 2003 (Year: 2003).*
W3C, W3C XForms Group Wiki (Public), "Variables in XPath", 2012 (Year: 2012).*

* cited by examiner

GATEWAY PATH VARIABLE DETECTION FOR METRIC COLLECTION

BACKGROUND

Field

Embodiments presented herein generally relate to gateway path variable detection for metric collection, and more specifically to detecting variables in paths included in requests received by an Application Programming Interface (API) gateway in order to better aggregate metrics associated with the requests.

Description of the Related Art

Application programming interfaces (APIs) generally expose various routines and methods to software developers for use in obtaining and modifying data using features of a software application. APIs may be accessible programmatically (e.g., as function calls in an application or function library) or via a web-service (e.g., WSDL) for web-based applications on client devices. Web-based applications can invoke functionality exposed by an API, for example, using a Representational State Transfer function call (a RESTful function call), queries encapsulated in an HTTP POST request, a Simple Object Access Protocol (SOAP) request, or other protocols that allow client software to invoke functions on a remote system.

In some cases, an API gateway may be employed to handle API calls and requests from a plurality of web-based applications on client devices and directed to a plurality of different web-based services. A request (e.g. HTTP POST request) received by the API gateway may include a Uniform Resource Locator (URL) or path to a resource which is being requested by a client device. The API gateway may send the request to the appropriate service, receive a response from the service including the requested resource, and provide the requested resource to the requesting client device. The API gateway may also measure and store performance metrics (e.g. response times, request/response payload sizes, and other metrics) related to processing requests from client devices so that the metrics can be aggregated and analyzed. In large distributed systems with multiple different APIs being used, the metrics may include a vast amount of varying information, and may be difficult to aggregate in any useful manner.

In particular, it can be challenging to aggregate performance metrics relating to requests which include URLs with variables (e.g. user defined sub-paths) in the path. For example, a client device may send a request destined for a particular service to the API gateway, and the request may be for a resource which is located at a path which includes a variable as a sub-path. If a large number of requests are received which include the same path with only the variable sub-path being different in each request, the API gateway may not recognize that there is a variable in the paths. Accordingly, the API gateway may not aggregate these requests together for purposes of metrics analysis, and the metrics may therefore be difficult to analyze.

Some solutions involve the use of a regular expression (regex), which generally comprises a sequence of characters defining a search pattern. A regex may, for instance, be used to identify a particular sub-path in a resource structure as a variable, and thereby replace all instances of the sub-path in requests with a placeholder (such as an asterisk) which identifies the sub-path as a variable. This allows for requests to be effectively aggregated, as all requests which differ only because of a variable will be recognized as being related. However, the use of a regex requires knowledge of the resource structure, because it involves identifying in advance certain sub-paths within a resource structure which are variables, and using a regex to define this pattern. For an API gateway with hundreds of services, each service having its own unique resource structure, manually creating this regex to aggregate metrics would be impossible to maintain. As such, there is a need for an efficient method of identifying variables in requests received by an API gateway so that performance metrics associated with such requests may be usefully aggregated.

SUMMARY

One embodiment of the present disclosure includes a method for gateway path variable detection for metric collection. The method generally includes receiving a plurality of requests from one or more clients, wherein each request is directed to a service and comprises a path which identifies a location of a resource requested from the service. The method further includes, for each request of the plurality of requests, separating the path associated with the request into a plurality of sub-paths. For each sub-path, the method further includes inserting a node representing the sub-path into a tree comprising nodes representing sub-paths from paths identified by the plurality of requests. The node may be inserted into the tree as a child of a parent node associated with a previous sub-path or as a root node if the sub-path is not preceded by any other sub-paths, and the sub-path may not be inserted into the tree if it is already represented by an existing node. The method further includes determining whether a number of child nodes of the parent node exceeds a threshold number. Upon determining that the number of child nodes of the parent node exceeds the threshold, the method further includes storing an indicator identifying the sub-path as a variable, generating a child node representing the variable, replacing the child nodes of the parent node with the child node representing the variable, and removing, from the tree, redundant child nodes of the child node representing the variable.

Another embodiment of the present disclosure includes a processor and a memory storing a program, which, when executed on the processor, performs the method for gateway path variable detection for metric collection described above.

Still another embodiment provides a non-transitory computer-readable storage medium having instructions, which, when executed on a processor, performs the method for gateway path variable detection for metric collection described above.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Application programming interfaces (APIs) generally expose methods and procedures that software developers can use to build software applications using features and services provided by a software system. These features may include, for example, database interaction, data processing, and so on. APIs generally define a set of inputs for an application to provide for processing and a set of outputs generated by the application in response to the inputs. In some web-based systems, when an application on a client device invokes an API request to retrieve data for display to a user (e.g. a financial services application retrieving an invoice from a database service), the client device may transmit the request to an API gateway which processes the request and passes it onto the appropriate service. The API gateway may receive a response from the service with the requested data and provide the data to the client device to be displayed to the user in the application. The API gateway may determine performance metrics related to processing the requests, and embodiments of the present invention may be employed by the API gateway to assist in aggregating these performance metrics. For example, the API gateway may employ variance thresholds in order to detect variables in paths associated with requests, and collapse the paths accordingly so that requests can be more effectively aggregated and analyzed.

Figure 1:
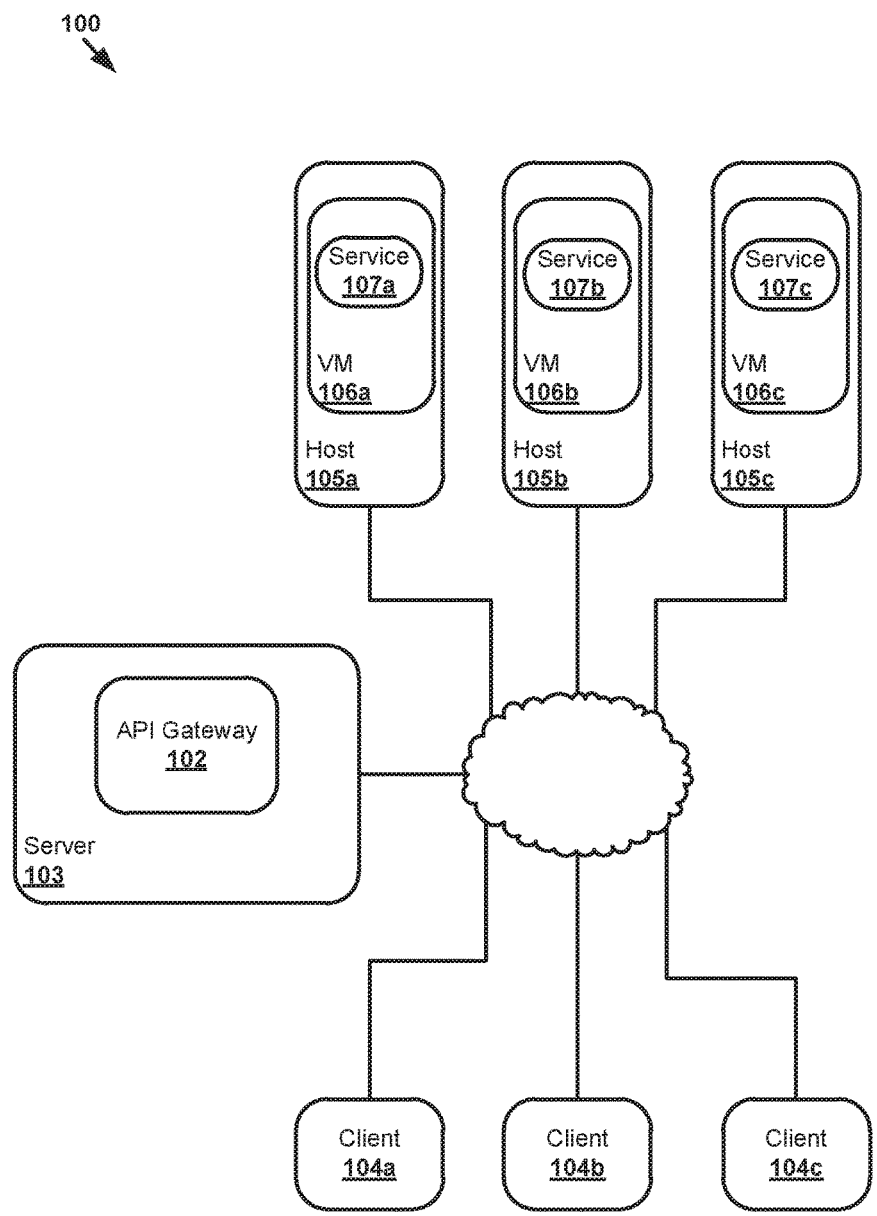
FIG. 1 illustrates an example computing environment, according to one embodiment.

FIG. 1 illustrates an example computing environment for gateway path variable detection for metric collection, according to some embodiments. As illustrated, computing environment 100 includes a server 103, a plurality of client devices 104, and a plurality of hosts 105.

Server 103 comprises an API gateway 102. API gateway 102 may, for example, be implemented as a software entity running on one or more virtual machines or containers executed by server 103. API gateway 102 may reside on a single server 103, as shown, or may be distributed across a plurality of physical machines and/or virtual computing instances. Server 103 may comprise one or more physical server devices (e.g. server computer, mainframe, blade computer, etc.), or may be implemented as a software entity executing on one or more physical hosts.

Client devices 104 may be implemented as any number of physical or virtual computing instances, and generally execute a plurality of applications. Some client devices 104 may, for example, execute web-based applications which invoke API function calls in order to interact, through API gateway 102, with remote services. A client device 104 may, for instance, be operated by a user who interacts with an application, such as a financial services application, running on client device 104. The application may invoke API calls based on user interactions with client device 104 through a user interface (e.g. a user may click a button to request an invoice), and the application may thereby request data from a remote service (e.g. a database service).

Hosts 105 generally comprise physical devices which host one or more virtual machines (VMs) 106, which execute one or more services 107. While services 107 are shown as executing within VMs 106, other embodiments may be employed without departing from the scope of the present disclosure. For example, service 107 may be implemented directly by hosts 105, or may be distributed across any number of physical devices or virtual computing instances. Services 107 may receive and respond to requests from API gateway 102 which originate from client devices 104.

A request from a client device 104 may comprise a Uniform Resource Locator (URL) which specifies a path to a resource to be retrieved from a service 107. When API gateway 102 processes a request from a client device 104 to a service 107, it may monitor certain performance criteria such as the response time from the service 107. API gateway 102 may store performance metrics in association with information about requests so that the performance metrics can be aggregated and provided to other applications for analysis and/or visualization. In some embodiments, API gateway 102 may group related responses together so that aggregated metrics, such as average response times for certain types of resources, may be determined. Because API gateway 102 handles requests associated with a large number of different services 107 with different APIs and different resource structures, API gateway 102 may need to perform additional processing in order to determine whether requests are related. As described in more detail below with respect to FIGS. 2-8, API gateway 102 may employ variance thresholds for sub-paths in order to detect variables (such as user-defined directories) in request paths, and thereby identify relationships between seemingly different requests.

Figure 2:
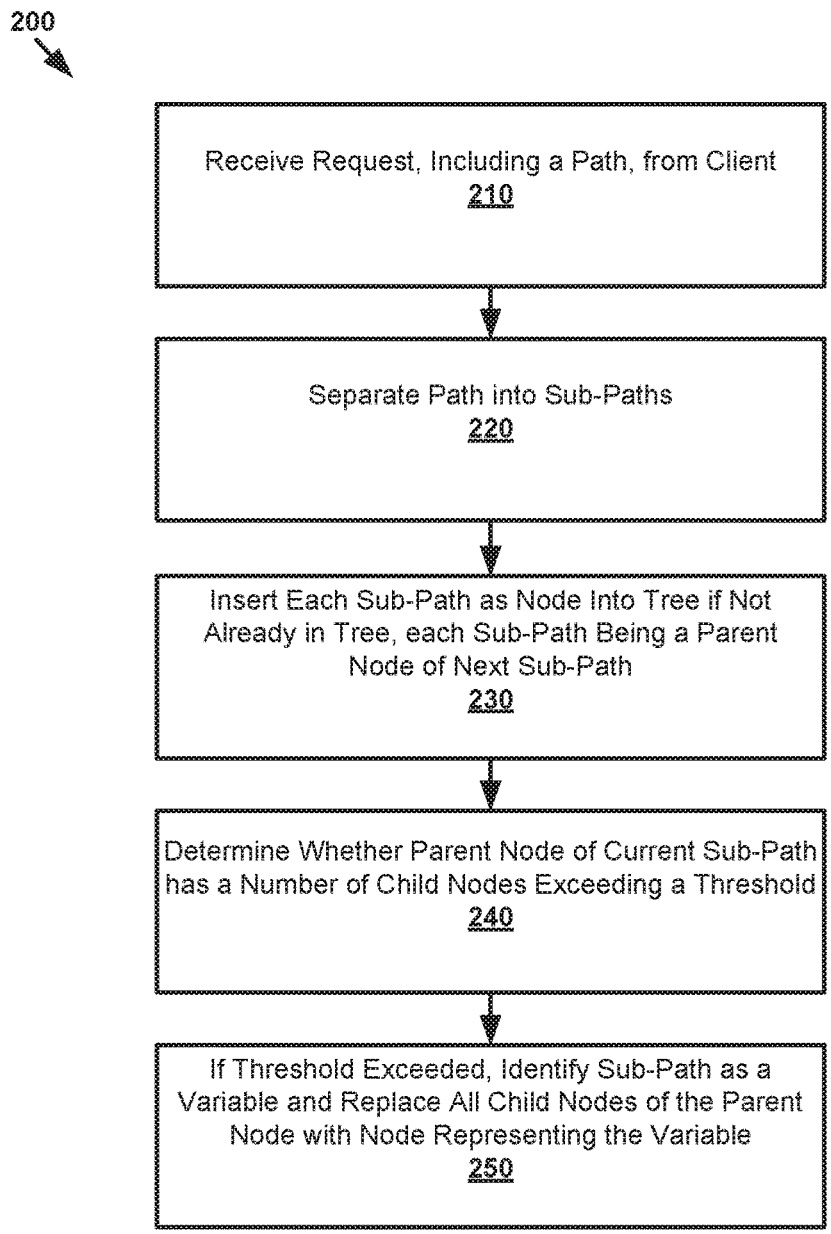
FIG. 2 illustrates example operations for gateway path variable detection according to certain embodiments.

FIG. 2 is a flow chart 200 illustrating a method for gateway path variable detection according to certain embodiments. The operations depicted in flow chart 200 may be implemented, for example, by API gateway 102.

At 210, API gateway 102 receives a request from a client 104, the request being directed to a service 107 and comprising a path which identifies the location of a resource being requested from the service 107.

At 220, API gateway 102 separates the path into sub-paths (e.g. the sub-strings within the path which are separated by a delimiter such as "I").

At 230, API gateway 102 inserts each sub-path as a node in a tree which comprises nodes representing sub-paths from a plurality of requests received by API gateway 102. API gateway 102 may, for example, consider the first sub-path in a path to be the root node, and each subsequent sub-path to be a child node of the previous sub-path. A sub-path may not be inserted as a node into the tree if the sub-path is already represented by a different node at the appropriate level of the tree.

At 240, if a sub-path has been inserted as a child node of a parent node, API gateway 102 determines whether a number of child nodes of the parent node exceeds a variance threshold. This will be described in more detail with respect to FIG. 3 below.

At 250, if the number of child nodes of the parent node exceeds the variance threshold, API gateway 102 stores an indicator which identifies the sub-path as a variable, and replaces all child nodes of the parent node with a single node representing the variable. All child nodes of the replaced child nodes become child nodes of the single node representing the variable, and redundant child nodes are removed.

Figure 3:
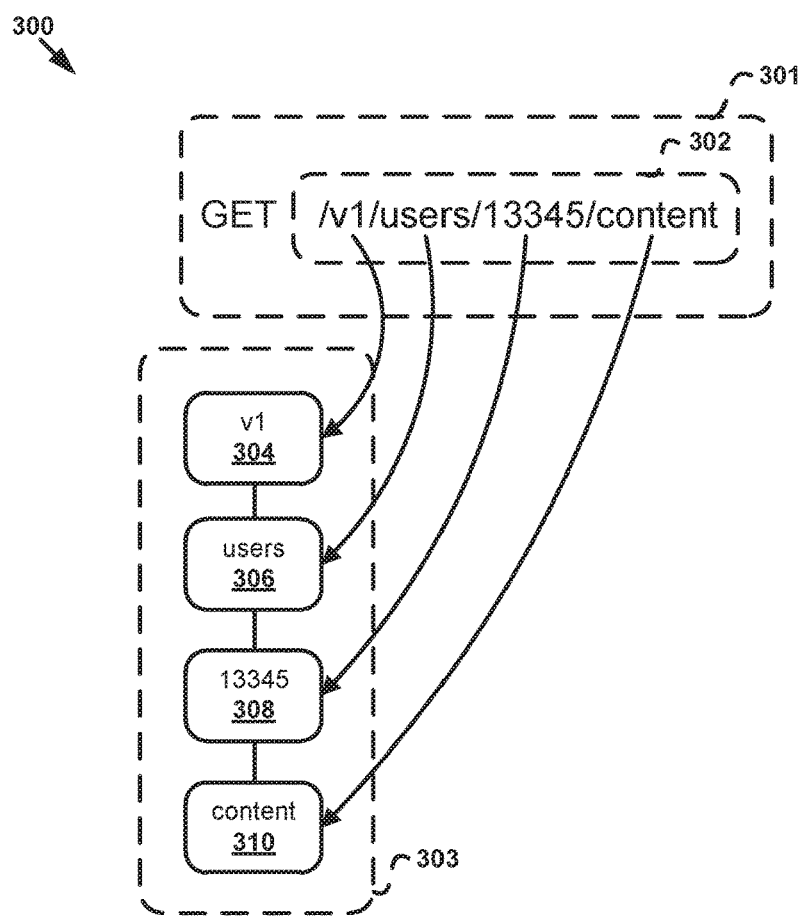
FIG. 3 illustrates a path in a request being separated into sub-paths and inserted into a tree.

FIG. 3 illustrates a process 300 wherein a path 302 in a request 301 is separated into sub-paths and inserted as nodes, 304, 306, 308, and 310, into a tree 303 according to certain embodiments of the present disclosure. Subsequent processes illustrated in FIGS. 4-8 show how the tree 303 is used to detect variables in paths. Process 300 may, for instance, be implemented by API gateway 102 with respect to a request 301 received from a client device 104 and directed to a service 107.

Request 301, as shown, may comprise an HTTP "GET" method which is invoked to retrieve a resource located at a particular path 302 within the resource structure of a particular service 107. Request 301 is only exemplary, and process 300 may be employed with any number of different types of methods and requests. Path 302 may include one or more sub-paths, which may be separated by delimiters. For example, as shown, path 302 may comprise sub-paths "v1", "users", "12345", and "content", each sub-path being preceded by a delimiter "I". In the embodiment shown, for example, the sub-path "12345" may be a variable (e.g. a user identifier within the "users" directory), and all instances of the variable (e.g. all user identifiers within the "users" directory) may include related sub-directories (e.g. each user identifier's directory may include "content"). API gateway 102 may not know the resource structure of the particular service 107, and so may be unaware that "12345" is a variable. As such, API gateway 102 may parse path 302 into sub-paths and insert the sub-paths as nodes 304, 306, 308, and 310 into a tree 303 as depicted in order to detect variables in path 302. Tree 303 may, for example, be a locally stored data structure which is generated and maintained by API gateway 102 as requests are processed.

API gateway 102 may use a variance threshold to determine whether a sub-path is a variable. For example, as nodes are inserted into the tree 303 for each request received, API gateway 102 may determine whether the number of different nodes at a particular level in the tree exceeds the variance threshold. If the number of different nodes at a certain level in the tree 303 (e.g. the number of nodes which are child nodes of "users", representing different sub-paths beneath the directory "users" in the resource structure) exceeds the variance threshold, then these sub-paths are identified as variables. The variance threshold may, for example, comprise a hard-coded value which represents the number of variance at a certain directory level which is likely to indicate a variable. Alternatively, the variance threshold may be set dynamically based on programmatic logic. In the embodiment depicted, the variance threshold is two, but in practice the variance threshold is generally a larger number.

In the embodiment depicted, API gateway 102 first inserts the sub-path "v1" as node 304 at the top level of tree 303. Next, sub-path "users" is inserted as node 306, and is a child of parent node 303, "v1", because "users" is a sub-directory of "v1". Subsequently, sub-path "12345" is inserted as node 308, and is a child of parent node 306, "users". Finally, sub-path "content" is inserted as node 310, and is a child of parent node 308, "12345".

As each sub-path is inserted as a node into the tree 303, API gateway 102 may first determine whether a node representing the sub-path is already present at the same level in the tree. If such a node is already present, then the node will not be inserted into the tree. Two nodes may be considered to be at the same level in the tree, for example, if the two nodes both share the same immediate parent node or if the two nodes both have no parent node. In the embodiment depicted in process 300, for example, there are no nodes present at any levels of the tree 303 before the sub-paths of path 302 are inserted, so all nodes are inserted. Also, as each sub-path is inserted, API gateway 102 may further determine whether the variance threshold at this level of the tree has been exceeded. In the embodiment depicted, the variance threshold is two, and has not yet been exceeded at any level of the tree 303.

Figure 4:
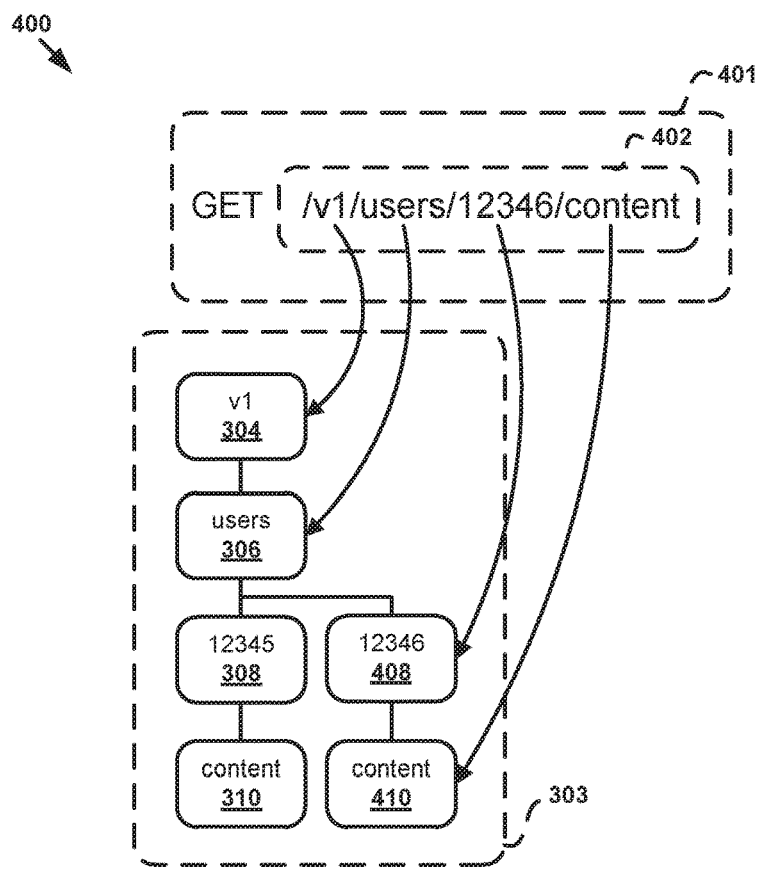
FIG. 4 illustrates a path in a second request being separated into sub-paths and inserted into the tree of FIG. 3.

FIG. 4 illustrates a process 400 by which a path 402 in a second request 401 is separated into sub-paths and inserted into the tree 303 of FIG. 3. Request 401 may comprise a request for a resource located at path 402, which is composed of sub-paths "v1", "users", "12346", and "content", each sub-path being preceded by a delimiter "I". In the embodiment shown, for example, the sub-path "12346" may be a variable (e.g. another user identifier within the "users" directory).

In the embodiment depicted, API gateway 102 first attempts to insert the sub-path "v1" at the top level of tree 303. Because sub-path "v1" is already represented by node 304 at this level of tree 303, there is no need to insert sub-path "v1" again. Accordingly, API gateway 102 will not insert this sub-path into the tree 303. Next, when API gateway 102 attempts to insert sub-path "users" as a child of node 304, it will again be determined that the sub-path "users" is already represented by node 306 at this level of the tree. Accordingly, API gateway 102 will not insert this sub-path into the tree 303. Next, API gateway will attempt to insert sub-path "12346" into the tree as a child node of node 306. Because sub-path "12346" is not yet represented by a node at this level of the tree 303, and because the variance threshold of two has not yet been exceeded at this level of the tree 303, sub-path "12346" is inserted as node 408, and is a child of node 306. Finally, because it is not yet represented by a node at this level of the tree 303 and because the variance threshold has not yet been met at this level of the tree 303, sub-path "content" is inserted as node 410, and is a child of node 408.

Figure 5:
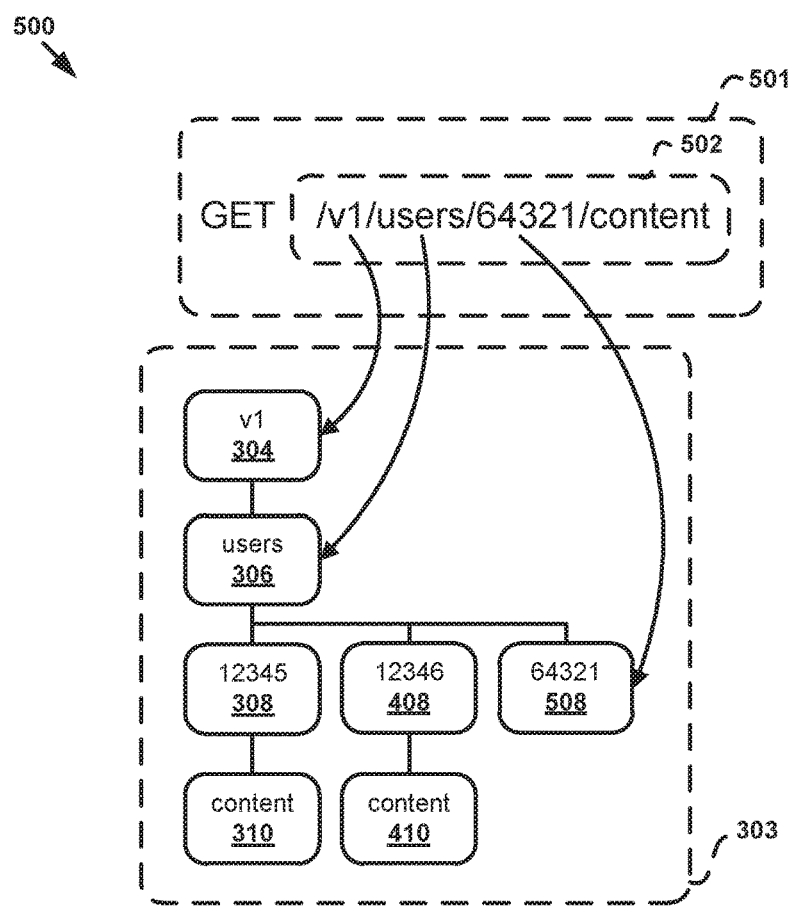
FIG. 5 illustrates a path in a third request being separated into sub-paths and inserted into the tree of FIG. 4.

FIG. 5 illustrates a process 500 by which a path 502 in a third request 501 is separated into sub-paths and inserted into the tree 303 of FIG. 4. Request 501 may comprise a request for a resource located at path 402, which is composed of sub-paths "v1", "users", "64321", and "content", each sub-path being preceded by a delimiter "I". In the embodiment shown, for example, the sub-path "64321" may be a variable (e.g. another user identifier within the "users" directory).

In the embodiment depicted, API gateway 102 first attempts to insert the sub-path "v1" at the top level of tree 303. Because sub-path "v1" is already represented by node 304 at this level of tree 303, there is no need to insert sub-path "v1" again. Accordingly, API gateway 102 will not insert this sub-path into the tree 303. Next, when API gateway 102 attempts to insert sub-path "users" as a child of node 304, it will again be determined that the sub-path "users" is already represented by node 306 at this level of the tree. Accordingly, API gateway 102 will not insert this sub-path into the tree 303. Next, API gateway will attempt to insert sub-path "64321" into the tree as a child node of node 306. While sub-path "64321" is not yet represented by a node at this level of the tree 303, inserting "64321" as node 508 exceeds the variance threshold of two (i.e. there are now three, greater than two, nodes which are child nodes of node 306).

Because the variance threshold of two has been exceeded at this level of the tree, API gateway 102 determines at this point that the sub-path "64321" represents a variable, as do sub-paths "12345" and "12346". Based on this determination, API gateway will continue with the process depicted in FIG. 6, described below.

Figure 6:
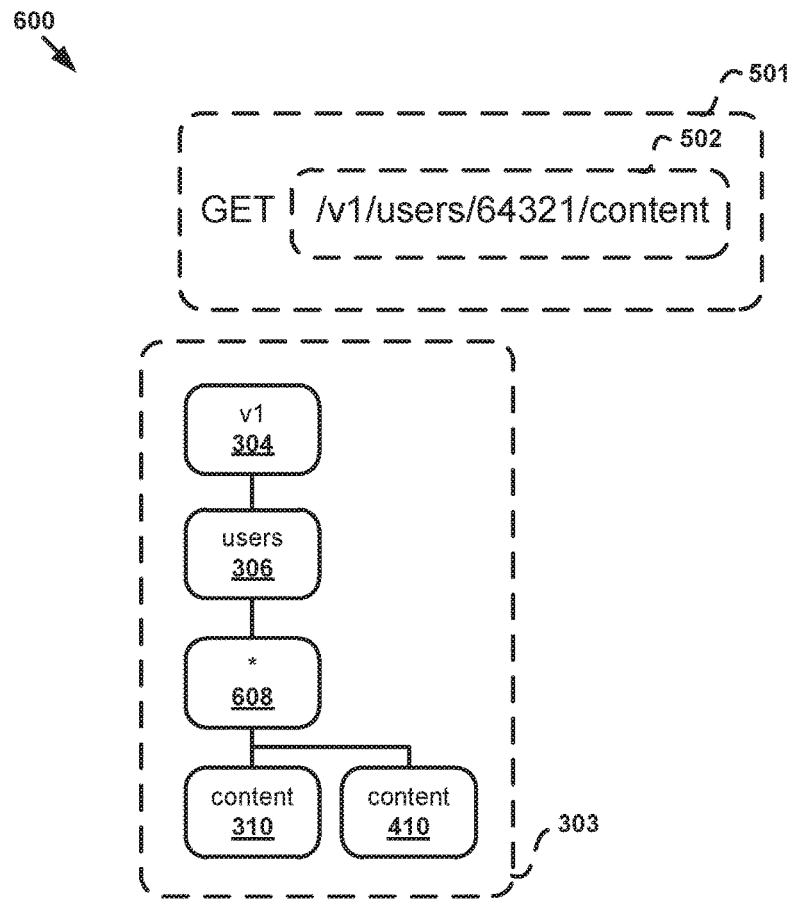
FIG. 6 illustrates a variable being identified based on a variance threshold, and the tree of FIG. 5 being collapsed accordingly.

FIG. 6 illustrates a process 600 by which a variable is identified based on a variance threshold, and a level of the tree 303 of FIG. 5 is collapsed accordingly.

Having identified based on the variance threshold that sub-paths "12345", "12346", and "64321", represented by nodes 308, 408, and 508, correspond to a variable, API gateway 102 replaces nodes 308, 408, and 508 with a single node 608 which identifies this level of the tree as corresponding to a variable. A placeholder, such as an asterisk, may be used to indicate a variable. This process may be referred to as "collapsing" a level of the tree 303. Subsequently, any child nodes of nodes which have been collapsed will become child nodes of the single node 608 which indicates a variable. For example, node 310, which was formerly a child of node 308, will become a child of node 608. Redundant nodes at this level of the tree may be removed at this point, as shown in FIG. 7, described below.

Figure 7:
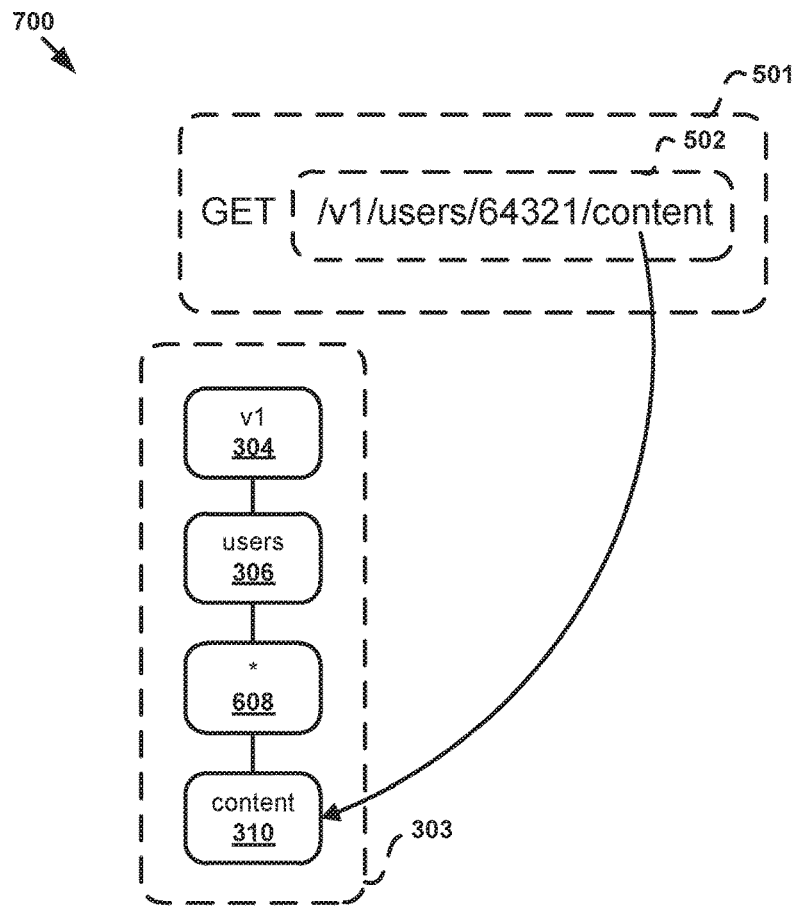
FIG. 7 illustrates redundant child nodes being removed from the tree of FIG. 6.

FIG. 7 illustrates a process 700 by which redundant child nodes are removed from the tree 303 of FIG. 6. As shown, the redundant "content" node 410 from FIG. 6 has been removed, as the sub-path "content" is already represented at this level of the tree by node 310.

Next, API gateway may continue to the next sub-path in path 502, which is "content". When API gateway 102 attempts to insert the sub-path "content" into the tree 303 as a child of node 608, API gateway 102 will determine that the sub-path "content" is already represented at this level of the tree 303 by node 310. Accordingly, the sub-path "content" will not be inserted.

Figure 8:
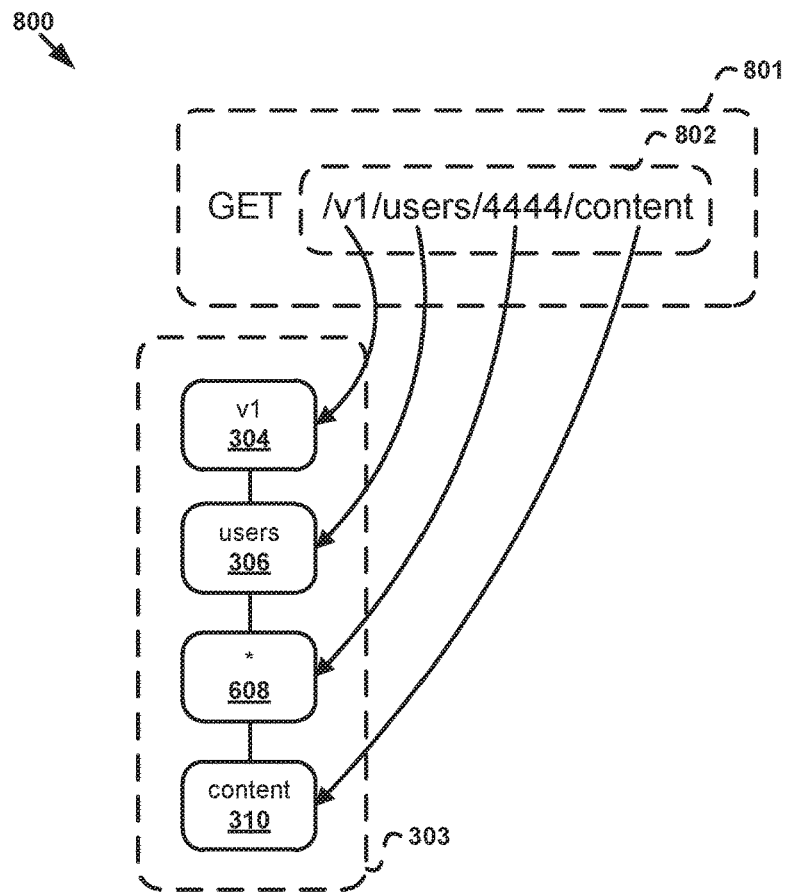
FIG. 8 illustrates a fourth request being separated into sub-paths and inserted into the tree of FIG. 7.

FIG. 8 illustrates a process 800 by which a path 802 in a fourth request 801 is separated into sub-paths and inserted into the tree 303 of FIG. 7. Request 801 may comprise a request for a resource located at path 802, which is composed of sub-paths "v1", "users", "4444", and "content", each sub-path being preceded by a delimiter "/". In the embodiment shown, for example, the sub-path "4444" may be a variable (e.g. another user identifier within the "users" directory).

In the embodiment depicted, API gateway 102 first attempts to insert the sub-path "v1" at the top level of tree 303. Because sub-path "v1" is already represented by node 304 at this level of tree 303, there is no need to insert sub-path "v1" again. Accordingly, API gateway 102 will not insert this sub-path into the tree 303. Next, when API gateway 102 attempts to insert sub-path "users" as a child of node 304, it will again be determined that the sub-path "users" is already represented by node 306 at this level of the tree. Accordingly, API gateway 102 will not insert this sub-path into the tree 303. Next, API gateway will attempt to insert sub-path "4444" into the tree as a child node of node 306. At this point, API gateway 102 will recognize, based on node 608, that this level of the tree has been identified as corresponding to a variable. As such, the sub-path "4444" will be identified as a variable, and will not be inserted into the tree 303.

Finally, when API gateway 102 attempts to insert sub-path "content" as a child of node 608, it will again be determined that the sub-path "content" is already represented by node 310 at this level of the tree. Accordingly, API gateway 102 will not insert this sub-path into the tree 303.

The tree 303 may be maintained by the API gateway 102 in local memory (e.g. a data cache), and may be continuously updated as new requests are received. The tree 303 may also be persisted in permanent storage (e.g. a remote repository, database, or hard disk). The steps exemplified by processes 300-800 may be repeated as requests are continuously received by API gateway 102 in order to identify variables in paths. When a variable is identified in a path, API gateway 102 may generate a condensed version of the path so that performance metrics associated with the path can be more effectively aggregated. This is illustrated in FIG. 9, described below.

Figure 9:
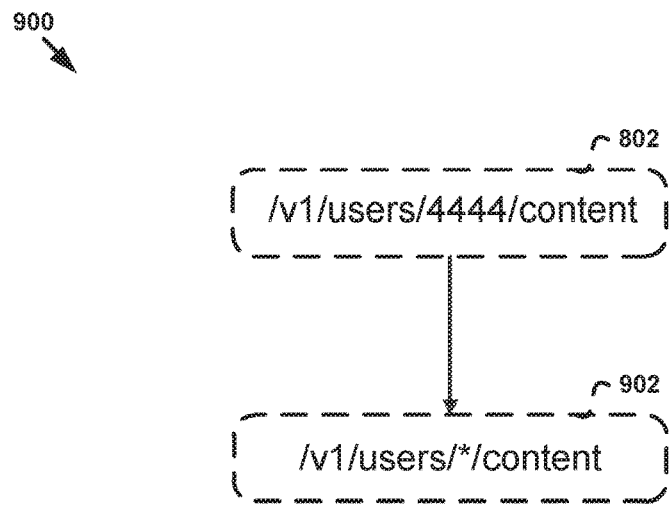
FIG. 9 illustrates a path from a request being modified to produce a condensed path according to certain embodiments.

FIG. 9 illustrates a process 900 by which path 802 from request 801 is modified to produce a condensed path 902 according to certain embodiments. While path 802 is depicted, the process 900 can be employed to produce a condensed version of any path in which a variable has been identified.

In the embodiment depicted, path 802 includes sub-path "4444", which has been identified as a variable (e.g. based on processes 300-700 described above). API gateway 102 produces condensed path 802 by modifying path 802 to replace sub-path "4444" with a variable placeholder "*". An asterisk is commonly used to indicate a variable, but any placeholder could be used (e.g. X, VAR, N, #). The resulting condensed path 902 may comprise a string wherein the variable sub-path "4444" has been replaced with a variable placeholder.

API gateway 102 may associate condensed path 902 with performance metrics for request 801. Condensed paths may also be produced for all other requests which include a variable in their path (e.g. requests 301, 401, and 501 described above), and performance metrics for these requests may also be associated with their respective condensed paths. In the embodiment depicted in FIGS. 3-9, for example, this would allow requests 301, 401, 501, and 801 to be grouped together as being directed to the same resource, and their performance metrics to be appropriately aggregated. For example, an average response time could be determined for all of these requests. The ability to determine such aggregate metrics based on a particular resource structure may be useful for such purposes as producing visualizations of performance metrics, identifying issues, providing alerts, and optimizing efficiency in request processing.

In some embodiments, API gateway 102 may write an entry to a log file for each request, the entry comprising at least the performance metrics, the path, and the condensed path if a variable is identified in the path. For example, API gateway 102 may write an entry to a log file which associates performance metrics with path 802 and condensed path 902. This may allow the log file entries to be aggregated according to the condensed paths.

Furthermore, in some embodiments, API gateway 102 may transmit the performance metrics along with paths and/or condensed paths from requests to a performance analytics application. The performance analytics application may, for example, use the performance metrics, paths, and condensed paths to aggregate, analyze, and/or visualize the performance metrics. In some embodiments, a graphical visualization of the performance metrics may be generated and displayed in which the performance metrics for requests are aggregated and modeled, using the paths and condensed paths, according to the resource structure.

In some embodiments, API gateway 102 may "sanitize" private data included in paths. For example, if a path includes an encryption key as a sub-path, API gateway 102 may recognize (e.g. based on comparison with patterns known to represent secure information) that the sub-path includes private data. Accordingly, API gateway 102 may generate a sanitized path by modifying the path to replace the private data with a placeholder (e.g. a sequence of asterisks). The process for producing a sanitized path may be similar to process 900 for producing a condensed path. Additionally, API gateway 102 may replace the private data with a placeholder in the tree 303, and may only transmit a sanitized version of the path to the log file and/or the performance analytics application.

Additionally, in some embodiments, API gateway 102 may maintain a list of "whitelisted" strings which have a known significance or fixed meaning. For example, the string "me" may be whitelisted as having a specific meaning when detected as a sub-path (e.g. this refers to the requesting user). When a whitelisted string is detected as a sub-path in a request path, this white-listed sub-path may be excluded from the variance threshold and variable detection process. For example, if "me" is whitelisted and a request is received which includes the path "/v1/users/me/content", the sub-path "me" will not be identified as a variable even if the variance threshold has been exceeded, and it will be inserted as a separate node at the appropriate level of the tree. This may allow for more accurate aggregation of performance metrics, as it helps to prevent sub-paths from being inaccurately identified as variables.

Figure 10:
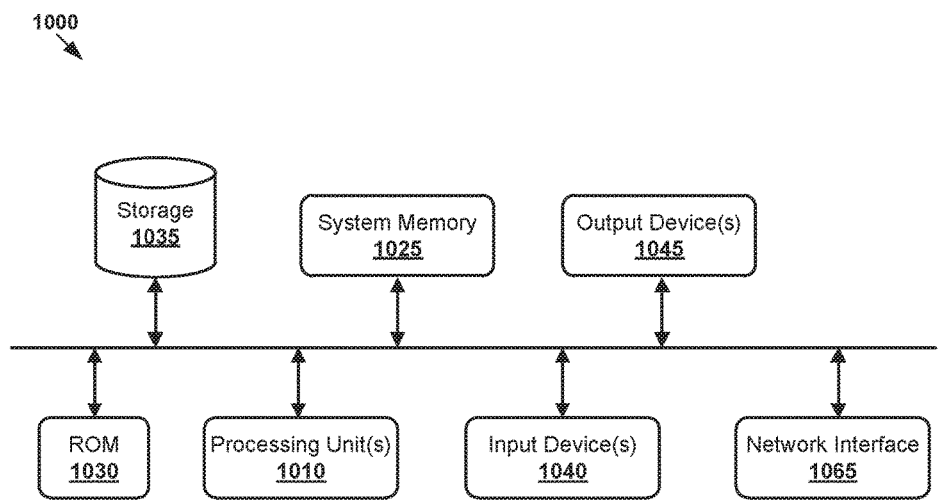
FIG. 10 illustrates a computer system with which some embodiments of the invention may be implemented.

FIG. 10 illustrates an example of an electronic system 1000 with which some embodiments of the invention are implemented. The electronic system 1000 can be used to execute any of the functionality described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for gateway path variable detection, comprising:
    receiving a plurality of requests from one or more clients, wherein each request of the plurality of requests is directed to a service and comprises a path that identifies a location of a resource requested from the service; and
    for each request of the plurality of requests:
        separating the path associated with the request into a plurality of sub-paths; and
        for each sub-path of the plurality of sub-paths:
            inserting a node representing the sub-path into a tree comprising nodes representing sub-paths from paths identified by the plurality of requests, wherein the node is inserted into the tree as a child of a parent node associated with a previous sub-path or as a root node if the sub-path is not preceded by any other sub-paths, and wherein the sub-path is not inserted into the tree if it is already represented by an existing node;
            determining whether a number of child nodes of the parent node exceeds a threshold number; and
            upon determining that the number of child nodes of the parent node exceeds the threshold number:
                storing an indicator identifying the sub-path as a variable;
                generating a child node representing the variable;
                replacing the child nodes of the parent node with the child node representing the variable; and
                removing, from the tree, redundant child nodes of the child node representing the variable.

2. The method of claim 1, wherein inserting a node representing the sub-path into the tree comprises:
    upon determining that a child node representing a variable is associated with a parent node corresponding to the previous sub-path, declaring that the sub-path is represented by an existing node in the tree.

3. The method of claim 2, further comprising:
    generating a condensed path by modifying the path to replace with a variable placeholder each sub-path that is identified by an indicator as a variable.

4. The method of claim 3, further comprising:
    identifying private data in the sub-path; and
    excluding the private data from both the node and the condensed path that are associated with the sub-path.

5. The method of claim 3, further comprising:
    processing the request;
    determining performance data based on the processing; and
    writing an entry to a log file, the entry comprising:
        the path;
        the condensed path; and
        the performance data.

6. The method of claim 5, further comprising:
    transmitting the condensed path and the performance data to a performance analytics application, wherein the performance analytics application produces a visualization based on the performance data and the condensed path.

7. The method of claim 5, wherein the processing comprises transmitting the request to a service and receiving a response from the service, and wherein the performance data comprises a response time.

8. A system, comprising:
    a processor; and
    memory storing instructions which, when executed on one or more processors, performs a method for gateway path variable detection, the method comprising:
        receiving a plurality of requests from one or more clients, wherein each request of the plurality of requests is directed to a service and comprises a path that identifies a location of a resource requested from the service; and
        for each request of the plurality of requests:
            separating the path associated with the request into a plurality of sub-paths; and
            for each sub-path of the plurality of sub-paths:
                inserting a node representing the sub-path into a tree comprising nodes representing sub-paths from paths identified by the plurality of requests, wherein the node is inserted into the tree as a child of a parent node associated with a previous sub-path or as a root node if the sub-path is not preceded by any other sub-paths, and wherein the sub-path is not inserted into the tree if it is already represented by an existing node;
                determining whether a number of child nodes of the parent node exceeds a threshold number; and
                upon determining that the number of child nodes of the parent node exceeds the threshold number:
                    storing an indicator identifying the sub-path as a variable;
                    generating a child node representing the variable;
                    replacing the child nodes of the parent node with the child node representing the variable; and
                    removing, from the tree, redundant child nodes of the child node representing the variable.

9. The system of claim 8, wherein inserting a node representing the sub-path into the tree comprises:
    upon determining that a child node representing a variable is associated with a parent node corresponding to the previous sub-path, declaring that the sub-path is represented by an existing node in the tree.

10. The system of claim 9, wherein the method further comprises:

generating a condensed path by modifying the path to replace with a variable placeholder each sub-path that is identified by an indicator as a variable.

11. The system of claim 10, wherein the method further comprises:
identifying private data in the sub-path; and
excluding the private data from both the node and the condensed path that are associated with the sub-path.

12. The system of claim 10, wherein the method further comprises:
processing the request;
determining performance data based on the processing; and
writing an entry to a log file, the entry comprising:
the path;
the condensed path; and
the performance data.

13. The system of claim 12, wherein the method further comprises:
transmitting the condensed path and the performance data to a performance analytics application, wherein the performance analytics application produces a visualization based on the performance data and the condensed path.

14. The system of claim 12, wherein the processing comprises transmitting the request to a service and receiving a response from the service, and wherein the performance data comprises a response time.

15. A non-transitory computer-readable medium comprising instructions which, when executed on one or more processors, performs a method for gateway path variable detection, the method comprising:
receiving a plurality of requests from one or more clients, wherein each request of the plurality of requests is directed to a service and comprises a path that identifies a location of a resource requested from the service; and
for each request of the plurality of requests:
separating the path associated with the request into a plurality of sub-paths; and
for each sub-path of the plurality of sub-paths:
inserting a node representing the sub-path into a tree comprising nodes representing sub-paths from paths identified by the plurality of requests, wherein the node is inserted into the tree as a child of a parent node associated with a previous sub-path or as a root node if the sub-path is not preceded by any other sub-paths, and wherein the sub-path is not inserted into the tree if it is already represented by an existing node;
determining whether a number of child nodes of the parent node exceeds a threshold number; and
upon determining that the number of child nodes of the parent node exceeds the threshold number:
storing an indicator identifying the sub-path as a variable;
generating a child node representing the variable;
replacing the child nodes of the parent node with the child node representing the variable; and
removing, from the tree, redundant child nodes of the child node representing the variable.

16. The non-transitory computer-readable medium of claim 15, wherein inserting a node representing the sub-path into the tree comprises:
upon determining that a child node representing a variable is associated with a parent node corresponding to the previous sub-path, declaring that the sub-path is represented by an existing node in the tree.

17. The non-transitory computer-readable medium of claim 16, wherein the method further comprises:
generating a condensed path by modifying the path to replace with a variable placeholder each sub-path that is identified by an indicator as a variable.

18. The non-transitory computer-readable medium of claim 17, wherein the method further comprises:
identifying private data in the sub-path; and
excluding the private data from both the node and the condensed path that are associated with the sub-path.

19. The non-transitory computer-readable medium of claim 17, wherein the method further comprises:
processing the request;
determining performance data based on the processing; and
writing an entry to a log file, the entry comprising:
the path;
the condensed path; and
the performance data.

20. The non-transitory computer-readable medium of claim 19, wherein the method further comprises:
transmitting the condensed path and the performance data to a performance analytics application, wherein the performance analytics application produces a visualization based on the performance data and the condensed path.

21. The non-transitory computer-readable medium of claim 19, wherein the processing comprises transmitting the request to a service and receiving a response from the service, and wherein the performance data comprises a response time.

* * * * *